March 11, 1952 G. V. ROGERS 2,588,938
POWER ACTUATED SCROLL CHUCK
Filed July 1, 1949 3 Sheets-Sheet 1
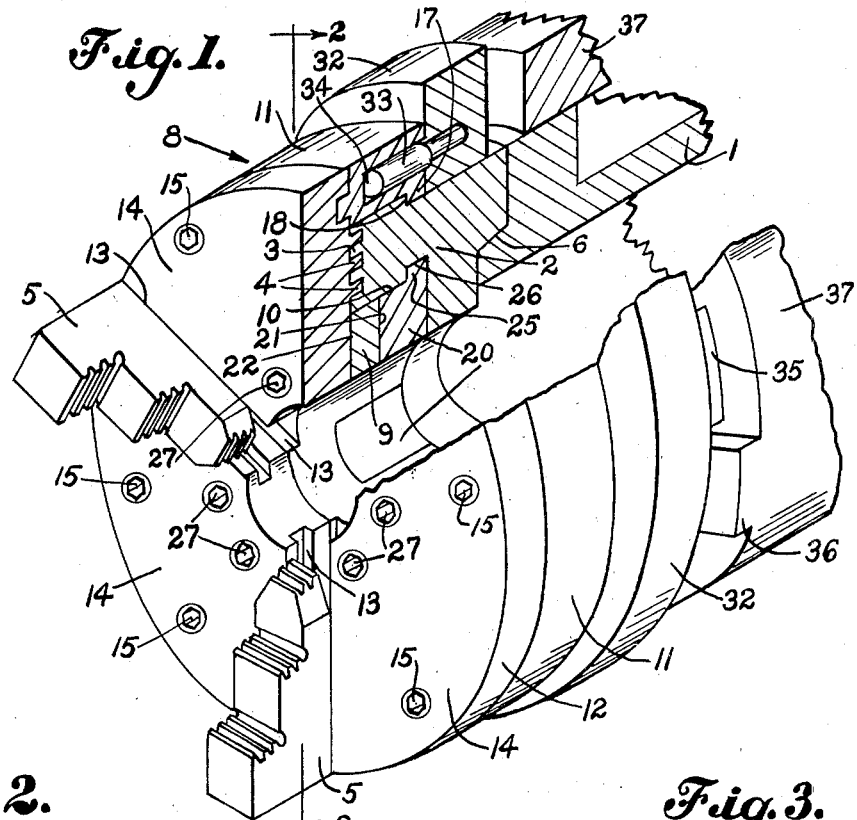
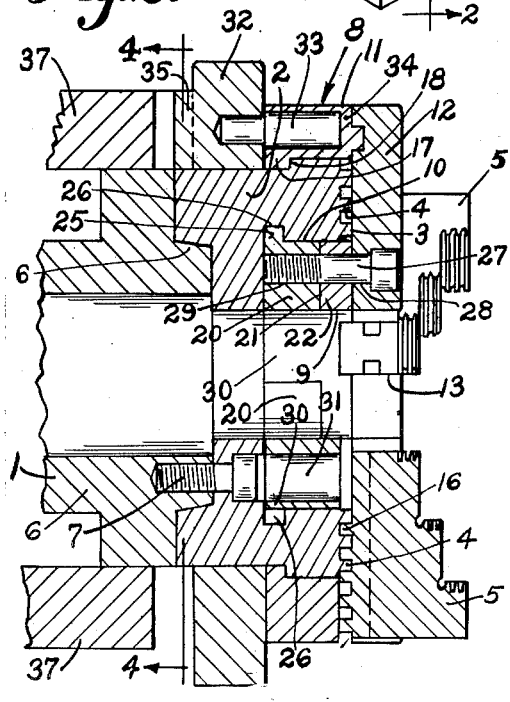
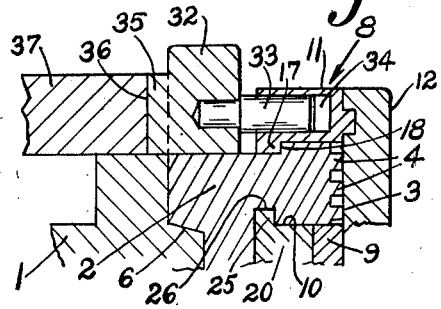
INVENTOR.
George V. Rogers.
BY Heard Smith Tennant
attorneys March 11, 1952  G. V. ROGERS  2,588,938
POWER ACTUATED SCROLL CHUCK
Filed July 1, 1949  3 Sheets-Sheet 2

INVENTOR.
George V. Rogers.
BY Heard Smith & Tennant
Attorneys

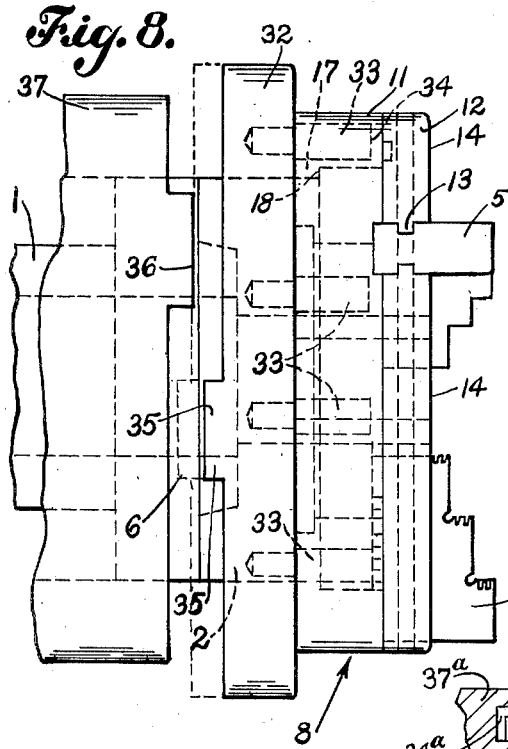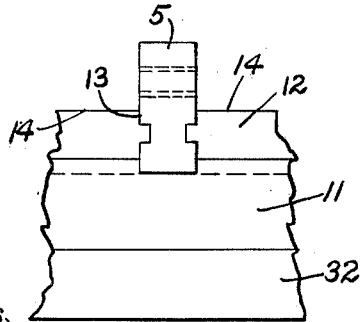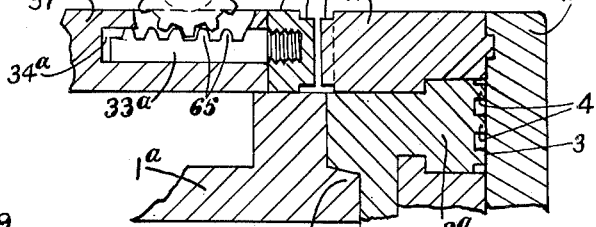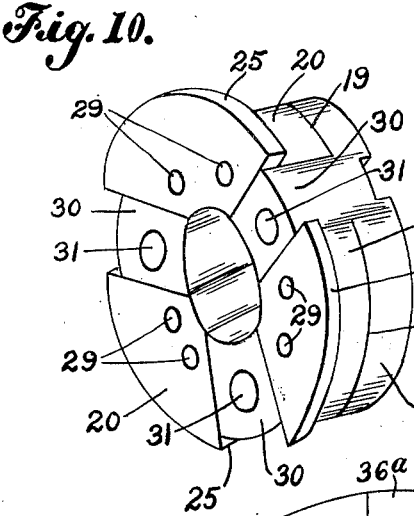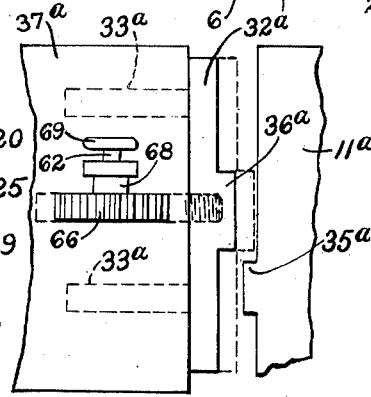

Patented Mar. 11, 1952

2,588,938

UNITED STATES PATENT OFFICE 2,588,938

POWER ACTUATED SCROLL CHUCK

George V. Rogers, Colchester, Salem, Conn.

Application July 1, 1949, Serial No. 102,461

6 Claims. (Cl. 279—114)

This invention relates to a power-actuated scroll chuck for lathes and similar machines in which the chuck jaws are moved into and out of work-gripping position by a suitable power mechanism, such as a high torque motor having a sliding member carrying a gear which engages a mating gear provided on the machine spindle for the purpose of rotating the latter.

One object of the invention is to provide a power-actuated scroll chuck of this type in which the scroll member is made fast to the live spindle, either by being rigidly secured directly thereto, or by being secured to an adapter plate which in turn is rigidly mounted on the spindle, and in which the chuck body, within which the scroll is located, is mounted on and supported by the scroll and is capable of rotative movement relative thereto and to the spindle.

A further object of the invention is to provide a novel power-actuated chuck of this type in which the chuck jaws are moved into and out of work-gripping position by locking the chuck body from rotation and then rotating the machine spindle thereby to give rotative movement to the scroll member which is fast thereon.

A further object of the invention is to provide a novel power-operated scroll chuck which is provided with means for locking the chuck body from turning movement and at the same time indexing the chuck to a desired loading position at such times as the chuck jaws are to be moved into or out of work-gripping position.

Further objects of the invention are to improve power-operated scroll chucks in the particulars hereinafter set forth.

In the drawings, wherein I have illustrated some selected embodiments of the invention, Fig. 1 is a perspective view of a scroll chuck embodying my invention with a portion broken out to better show the interior construction.

Fig. 2 is a section on the line 2—2, Fig. 1 showing the chuck body in its unlocked or free position.

Fig. 3 is a fragmentary view showing the chuck body locked from movement, which is the condition that exists when the chuck jaws are to be moved into or out of work-gripping position.

Fig. 8 is a side view of a chuck embodying my invention.

Fig. 9 is a fragmentary view showing an end elevation of one of the chuck jaws.

Fig. 10 is a perspective view of the assembled inner ring member and the retaining members.

Fig. 11 is a fragmentary view showing a different embodiment of the invention.

Fig. 12 is a sectional view similar to Fig. 3 but showing the form of the invention illustrated in Fig. 11.

Fig. 13 is a view of the control member shown in Figs. 11 and 12.

Figure 4:
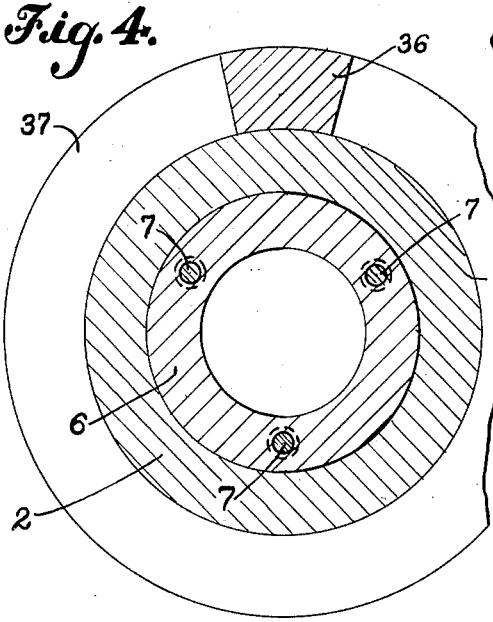
Fig. 4 is a section on a reduced scale on the line 4—4, Fig. 2 looking toward the left.

In the drawings I have illustrated my improved chuck as being mounted upon the live spindle 1 of a lathe or other similar machine although said chuck might be mounted upon an adapter plate which is secured to the spindle.

As stated above, in my improved chuck the scroll is made fast to the live lathe spindle element while the chuck body within which the scroll operates is loose on the spindle and free to rotate relative to the spindle. The scroll member of the chuck is indicated at 2, it being rigidly secured in any approved way to the live spindle or to an adapter plate which in turn is rigidly mounted on the live spindle. As shown in the drawings, the spindle has a slightly tapered nose portion 6 which fits into a recess in the back face of the scroll 2 with a precision interlocking fit, said scroll being rigidly bolted to the spindle by bolts or screws 7 which provide the interlocking fit. Any other manner of rigidly attaching the scroll to the live spindle which includes a precision interlocking fit may be employed without departing from the invention.

The scroll member is formed on its front face 3 with the usual scroll thread 4 with which the teeth 16 on the chuck jaws 5 have engagement.

The chuck body, which is indicated generally at 8, and which encloses the scroll member 2, comprises an inner ring member 9 received within a central recess 10 with which the scroll member 2 is provided, an outer ring member 11 which encircles the scroll member 2 and a face plate element 12 that is secured to the inner and outer ring members 9 and 11 and which is provided with the usual slots or grooves 13 in which operate the chuck jaws 5. In the construction illustrated the grooves 13 extend through the face plate 12 and thus divide it into a plurality of segments 14. The face plate segments 14 are permanently secured to the outer ring 11 by means of attaching screws or bolts 15 and said outer ring 11 is provided on its back face with an inwardly directed flange portion or lip 17 which engages a rearwardly directed peripheral shoulder 18 with which the scroll member 2 is provided, the engagement of said lip 17 with the shoulder 18 preventing relative axial movement in one direction between the scroll member 2 and the outer ring 11, relative axial movement of these parts in the opposite direction being prevented by the engagement of the rear face of the face plate 12 with the front face of the scroll member.

The inner ring member 9 is formed on its rear face with a plurality of recesses 19 to receive retaining members 20. The body portion of each retaining member 20 has a size and shape to fit the corresponding recess in which it is received with the front face 21 of the retaining member in engagement with the face 22 of the recess and with the side faces 23 of the retaining member in engagement with the side faces 24 of the corresponding recess. Each retaining member 20 is also provided with a peripheral retaining flange 25 which fits within an internal groove 26 with which the scroll member 2 is provided as best seen in Figs. 1 and 2.

The face plate segments 14 are secured to the inner ring and the retaining members 20 by means of attaching screws 27 which extend through openings in the face plate segments and through openings 28 in the inner ring member and which screw into threaded openings 29 with which the retaining members 20 are provided.

In assembling the parts, the retaining members 20 may be placed in position within the recess 10 of the scroll member 2 either before or after the latter is mounted on the spindle, after which the inner ring 9 is placed in position, the rearwardly projecting portions 30 of the inner ring being located between the retaining members 20 and holding them properly spaced from each other. The face plate may then be attached to the inner ring and retaining members by the screws 27.

To provide for attaching the scroll member to the nose 6 of the spindle by means of the screws 7, after the face plate 12 and inner ring 9 have been assembled with the scroll member, each of the rearwardly projecting portions 30 of the inner ring is formed with a through opening 31 of a size to receive the head of the screws 7. The construction is such that the openings 31 are lined up with the jaw-guiding grooves 13 of the face plate so that with the jaws removed, the openings 31 will be exposed to permit the attaching screws 7 to be installed.

As stated above the operation of moving the chuck jaws 5 in their grooves 13 is accomplished by holding the chuck body 8 from rotative movement and then rotating the spindle with the scroll member 2 fast thereon, whereby the engagement of the scroll thread with the teeth 16 on the chuck jaws will move said jaws outwardly or inwardly depending upon the direction in which the spindle 1 is rotated.

Figure 5:
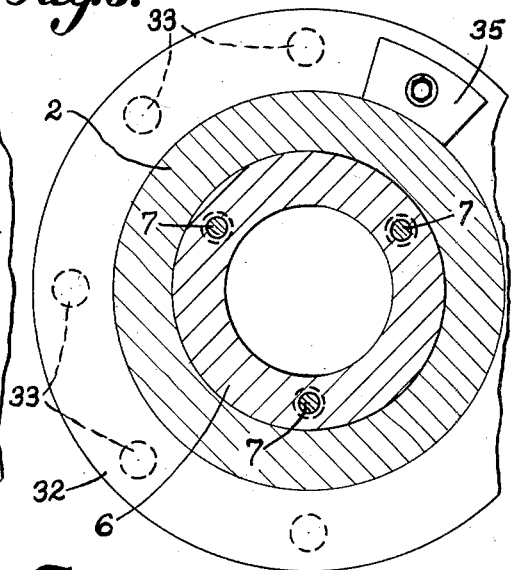
Fig. 5 is a similar view looking toward the right.
Figure 6:
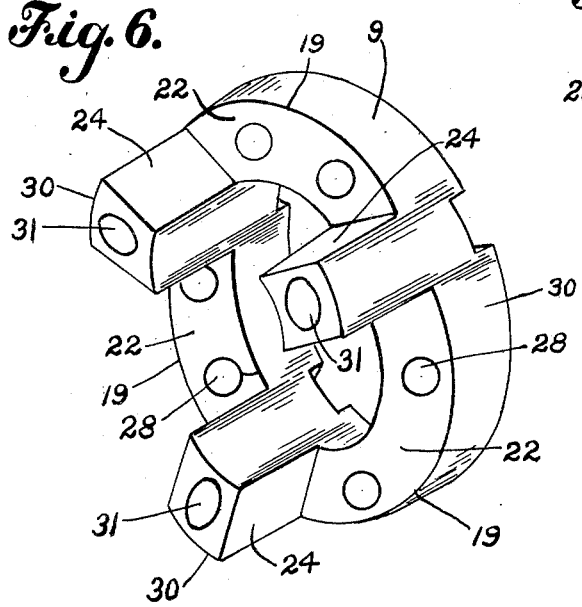
Fig. 6 is a perspective view of the inner ring member of the chuck body.
Figure 7:
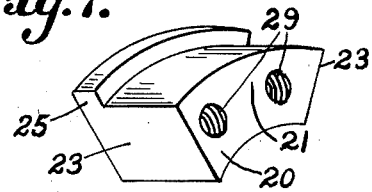
Fig. 7 is a perspective view of one of the retaining members by which the inner ring is retained in position within the scroll member.

For locking the chuck body from rotative movement when it is desired to adjust the chuck jaws 5, there is provided in Figs. 1 to 8 a control member 32 in the form of a ring which encircles the scroll member 2 and which is connected to the outer ring 11 for rotation therewith but which is adapted to be moved relative to the outer ring in an axial direction between a position in which it is locked from rotative movement and another position in which it is free for rotative movement. Said control ring 32 is provided with a plurality of forwardly extending pins 33 which are received in recesses 34 with which the outer ring member 11 is provided, said pins thus locking the control ring 32 to the outer ring 11 so that the two rings can have no rotative movement relative to each other but must always rotate as a unit. The control ring 32 has on its rear face a lug 35 which is adapted to engage a similar lug 36 formed on a stationary element 37 which may be part of the headstock of the lathe or may be a separate element rigidly secured to the headstock.

When the control member 32 is in the position shown in Figs. 2 and 8, the lug 36 on the stationary member 37 is out of the path of movement of the lug 35 on the control ring 32 and hence the chuck body and the control ring are free to rotate. When, however, the control ring 32 is moved to the left into the position shown in Fig. 3, and in dotted lines Fig. 2, the stationary lug 36 on the stationary part 37 will be in the path of movement of the lug 35 on the control ring so that rotative movement of the chuck body and control ring will bring the lug 35 up against the stationary lug 36 and will thus stop any further rotative movement of the chuck body.

The lug 35 on the control ring 32 is so positioned that when it is brought into engagement with the stationary lug 36, the chuck body will be indexed in work-receiving position, which preferably is a position in which one of the chuck jaws 5 is at the bottom of the chuck as shown in Fig. 1.

If desired the lug 35 on the control ring may be adjustable thereon so that it can be set in the correct position for indexing the chuck, and for this purpose said lug is shown as secured to the control ring by means of a screw 35b, the control ring preferably having a plurality of tapped holes into which said screw 35b may be entered to properly position said lug.

When, therefore, a work-piece is to be clamped in the chuck, the control member 32 will be moved into its operative position shown in Fig. 3 and in dotted lines, Fig. 8, and the chuck body will be turned on the scroll until the lug 35 thereon comes into engagement with the stationary lug 36 thereby preventing further turning movement of the chuck body. As stated above the lugs 35 and 36 are so relatively positioned that when they are in engagement and the chuck body is locked from further turning movement, said chuck body will be properly indexed for receiving the work-piece.

After the two lugs have thus been brought into contact and the chuck body is prevented from further rotative movement, the spindle, with the scroll member 2 rigid therewith will be turned in the proper direction to cause the scroll thread 4 to move the jaws 5 inwardly against the work. When the work has been firmly clamped in the chuck, then the control member 32 is returned to its free position shown in Fig. 2.

When the lathe is operating, the driving force for turning the work-piece is conveyed from the spindle 1 through the scroll member 2 to the chuck jaws 5 and the camming action of the scroll thread 4 on the teeth 16 of the jaws serves to hold the jaws firmly gripped against the work, and as the resistance which the work offers to turning movement is increased, the camming action between the scroll thread and the teeth 16 of the jaws will be increased thereby increasing the gripping action of the jaws against the work.

When the work is to be unchucked, the control member 32 is then again moved into its operative position shown in Fig. 3 and in dotted lines Fig. 8, and the spindle is given a reverse rotative movement. During the first part of this movement the chuck body will rotate with the spindle until the lug 35 on the control member 32 is brought up against the stationary lug 36 thereby preventing further rotation of the chuck body. Continued backward rotation of the spindle will then operate through the scroll to move the chuck jaws outwardly and thus release the work. By using a single lug 35 on the control member 32 and a single lug 36 on the stationary member 37, a hammer-like effect is produced when the two lugs are brought into contact on the unchucking operation, which is an advantage because such operation will readily loosen the chuck jaws.

In Figs. 11, 12 and 13 I have shown a different form of the invention in which the control member is mounted on the headstock of the lathe rather than on the chuck body. In this embodiment of the invention the scroll member is indicated at 2a and is mounted on the spindle 1a as above described. The chuck body comprises the outer ring 11a which is located outside of the scroll member 2a and which has on its rear face a lug 35a. The stationary member 37a, which may form part of the headstock of the lathe or may be a separate element rigidly secured to the headstock, has mounted thereon a control member 32a having on its front face a lug 36a. The control member 32a is provided with a series of pins 33a which are received in recesses 34a formed in the stationary part of the lathe 37a. One of these pins is provided with gear teeth 65 which mesh with an adjusting gear 66 carried by a shaft 67 which is mounted in bearings 68 on the stationary member 37a, said shaft having a hand wheel 69 by which it may be turned.

With this construction the control member 32a may be moved from its inoperative position shown in full lines Fig. 11, to its operative position shown in dotted lines. When the control member 32a is in the inoperative position, its lug 36a is out of the path of movement of the lug 35a on the chuck body so that the chuck is free to rotate, but when the control member 32a is moved forwardly into its operative position, then the lug 36a thereon is brought into the path of movement of the lug 35a on the chuck body and the engagement of the two lugs will lock the chuck body from rotative movement for the purpose of chucking or unchucking a work-piece as above described.

One advantage of the construction herein shown is that in making the scroll, it may be threaded while mounted with a precision interlocking fit on a fixture corresponding to the live spindle element 1, and hence when it is thus accurately machined and is then mounted on the live machine spindle element with the same precision interlocking fit, it will have the same accuracy when installed in the chuck as it had when the machining on it was completed.

The term "spindle element" as herein used is intended to include not only the live spindle 1 but also an adapter plate rigidly mounted on said spindle.

I claim:

1. A power-operated scroll chuck comprising a scroll member provided with a scroll thread, means mounting said scroll member rigidly in a live machine spindle element with a precision interlocking fit, a chuck body mounted on and supported by the scroll and capable of rotative movement relative thereto, said chuck body having radial jaw-guiding grooves, jaws operating in said grooves and having teeth that are engaged by the scroll thread, and means to lock the chuck body from rotative movement, whereby the jaws may be moved into and out of work-gripping position by rotating the spindle and the scroll while the chuck body is locked from turning movement.

2. A power-operated scroll chuck comprising a scroll member having a scroll thread, means mounting said scroll member rigidly on a live machine spindle element with a precision interlocking fit, a chuck body mounted on and supported by the scroll and capable of rotative movement relative to the scroll, said chuck body including a face plate having radial jaw-guiding grooves, work-gripping jaws in said grooves, each jaw having teeth in engagement with the scroll thread, and means to lock the chuck body from turning movement, whereby the jaws may be moved into and out of work-gripping position by turning the spindle while the chuck body is locked from turning movement.

3. A power-operated scroll chuck comprising a scroll member provided with a scroll thread, means for mounting said scroll member on a live machine spindle element with a precision interlocking fit, a chuck body mounted on and supported by the scroll member and capable of rotative movement relative thereto, said chuck body having radial jaw-guiding grooves, jaws operating in said grooves and having teeth that are engaged by the scroll thread, said chuck body also having a locking lug, a stationary member having a cooperating lug, means to move said lugs relative to each other in an axial direction to bring the lug on the stationary member into and out of the path of rotative movement of the lug on the chuck body, whereby when the lug on the stationary member is in the path of rotative movement of the lug on the chuck body, said chuck body is locked from turning movement and the chuck jaws may be moved into and out of work-gripping position by rotating the spindle and the scroll.

4. A power-actuated scroll chuck comprising a scroll member provided with a scroll thread, means rigidly mounting said scroll member on a live machine spindle element with a precision interlocking fit, a chuck body loosely mounted on and supported by said scroll for rotative movement relative thereto, said chuck body having a plurality of radial jaw-guiding grooves, jaws operating in said grooves, each jaw having teeth in engagement with the scroll thread, an annular control member encircling the scroll and connected to the chuck body for rotative movement therewith but capable of limited movement relative thereto in an axial direction between a locked position and a free position in which it is free for turning movement, and means cooperating with said control member to lock it and the chuck body connected thereto from turning movement when said control member is in its locked position.

5. A power-operated scroll chuck comprising a scroll member provided with a scroll thread, means mounting said scroll member on a live machine spindle element with a precision interlocking fit, said scroll member having a central recess, a chuck body loosely mounted on and supported by the scroll for free turning movement thereabout, said chuck body comprising an inner ring member occupying said recess of the scroll member, an outer ring member encircling the scroll member and a face plate secured to both ring members, said face plate having a plurality of radial jaw-guiding grooves, jaws in said grooves, each jaw having teeth engaging said scroll thread, and means for locking the chuck body from turning movement, whereby when the chuck body is thus locked the rotation of the spindle and the scroll member will move the jaws radially in their grooves.

6. A power-operated scroll chuck comprising a scroll member provided with a scroll thread and a central recess, means mounting said scroll member rigidly on a live machine spindle element with a precision interlocking fit, a chuck body loosely mounted on and supported by the scroll and free for turning movement thereabout, said chuck body comprising an inner ring member occupying said recess of the scroll member, an outer ring member encircling the scroll member and a face plate secured to both ring members, said face plate having a plurality of radial jaw-guiding grooves, each ring member and the scroll having inter-engaging parts which prevent them from relative movement in an axial direction while permitting free relative turning movement about the spindle, and means to lock the chuck body from turning movement, whereby the jaws may be moved into and out of work-gripping position by rotating the spindle and the scroll while the chuck body is locked from turning movement.

GEORGE V. ROGERS.

REFERENCES CITED

The following references are of record in the file of this patent:

UNITED STATES PATENTS

| Number | Name | Date |
| --- | --- | --- |
| 1,509,510 | Hanna | Sept. 23, 1924 |
| 1,595,399 | Horton | Aug. 10, 1926 |
| 1,699,359 | Hay | Jan. 15, 1929 |
| 2,423,244 | Lovely | July 1, 1947 |
| 2,429,524 | Oetzel | Oct. 21, 1947 |